United States Patent
Shimizu et al.

(10) Patent No.: US 10,328,866 B2
(45) Date of Patent: Jun. 25, 2019

(54) IMAGE PROCESSING APPARATUS AND IMAGE PROCESSING METHOD FOR GENERATING SYNTHETIC IMAGE AND CHANGING SYNTHETIC IMAGE

(71) Applicant: FUJITSU TEN LIMITED, Kobe-shi, Hyogo (JP)

(72) Inventors: Kenta Shimizu, Kobe (JP); Masahiro Yamada, Kobe (JP); Yasuyoshi Sawada, Kobe (JP); Takumi Hayashida, Kobe (JP); Azusa Matsuoka, Kobe (JP); Naoyuki Okada, Kobe (JP); Minoru Fujioka, Kobe (JP); Yuka Shidochi, Toyota (JP); Toshinori Esaka, Miyoshi (JP)

(73) Assignee: FUJITSU TEN LIMITED, Kobe (JP)

( * ) Notice: Subject to any disclaimer, the term of this patent is extended or adjusted under 35 U.S.C. 154(b) by 138 days.

(21) Appl. No.: 14/655,918

(22) PCT Filed: Nov. 5, 2013

(86) PCT No.: PCT/JP2013/079934
§ 371 (c)(1),
(2) Date: Jun. 26, 2015

(87) PCT Pub. No.: WO2014/119081
PCT Pub. Date: Aug. 7, 2014

(65) Prior Publication Data
US 2015/0356735 A1 Dec. 10, 2015

(30) Foreign Application Priority Data

Jan. 30, 2013 (JP) ................................. 2013-016193

(51) Int. Cl.
*B60R 1/00* (2006.01)
*G06K 9/00* (2006.01)
(Continued)

(52) U.S. Cl.
CPC ................. *B60R 11/04* (2013.01); *B60R 1/00* (2013.01); *G06K 9/00791* (2013.01);
(Continued)

(58) Field of Classification Search
CPC ........... G06K 9/00812; G06K 9/00791; G06K 9/00798; G08G 1/168; G06T 2207/30264;
(Continued)

(56) References Cited

U.S. PATENT DOCUMENTS 6,911,997 B1 * 6/2005 Okamoto .................. B60R 1/00 348/148
2006/0227138 A1 * 10/2006 Oizumi ..................... B60R 1/00 345/428

(Continued)

FOREIGN PATENT DOCUMENTS

| DE | 10 2010 034 139 A1 | 2/2012 |
| JP | 2010-200054 A | 9/2010 |

(Continued)

OTHER PUBLICATIONS

German Patent and Trademark Office, Office Action With Respect to Prior Art for DE 11 2013 006 544.4, Apr. 23, 2019 (Year: 2019)*

(Continued)

*Primary Examiner* — David N Werner
(74) *Attorney, Agent, or Firm* — Oliff PLC (57) ABSTRACT

An image processing apparatus for processing an image according to one embodiment includes a generating unit, a display control unit, and a change receiving unit. The display control unit generates a synthetic image providing a view of a vehicle from a virtual viewpoint, based on a plurality of onboard camera images. The display control unit displays the generated synthetic image on a display unit. The change receiving unit receives a change in the relative positional relation between an image region that is based on one of the (Continued)

camera images and image regions that are based on the other camera images in the synthetic image. The generating unit generates a synthetic image, based on a changed positional relation every time a change in the positional relation is received.

5 Claims, 10 Drawing Sheets

(51) Int. Cl.
G06K 9/62 (2006.01)
G06T 7/00 (2017.01)
G06T 7/80 (2017.01)
H04N 7/18 (2006.01)
B60R 11/04 (2006.01)
G06T 11/60 (2006.01)

(52) U.S. Cl.
CPC ............ *G06K 9/6201* (2013.01); *G06T 7/80* (2017.01); *G06T 7/97* (2017.01); *G06T 11/60* (2013.01); *H04N 7/181* (2013.01); *B60R 2300/101* (2013.01); *B60R 2300/102* (2013.01); *B60R 2300/105* (2013.01); *B60R 2300/304* (2013.01); *B60R 2300/402* (2013.01); *B60R 2300/602* (2013.01); *B60R 2300/607* (2013.01); *G06T 2200/24* (2013.01); *G06T 2207/30204* (2013.01); *G06T 2207/30252* (2013.01)

(58) Field of Classification Search
CPC .. G06T 7/80; G06T 7/97; H04N 7/181; B60R 11/04; B60R 2300/101; B60R 2300/102; B60R 2300/105; B60R 2300/607; B60R 2300/602; B60R 2300/402; B60R 2300/60; B60R 2300/303
See application file for complete search history.

(56) References Cited

U.S. PATENT DOCUMENTS

| | | | | |
|---|---|---|---|---|
| 2008/0136673 A1* | 6/2008 | Jung | .................. | B62D 15/0285 340/932.2 |
| 2008/0181488 A1* | 7/2008 | Ishii | .................. | B60R 1/00 382/154 |
| 2008/0198229 A1 | 8/2008 | Hongo | | |
| 2008/0252729 A1* | 10/2008 | Chiu | .................. | B60R 1/00 348/148 |
| 2010/0066833 A1* | 3/2010 | Ohshima | .................. | B60R 1/00 348/148 |
| 2010/0110194 A1* | 5/2010 | Euler | .................. | B60R 1/00 348/149 |
| 2011/0074196 A1* | 3/2011 | Chen | .................. | A47D 13/10 297/260.2 |
| 2011/0285848 A1* | 11/2011 | Han | .................. | B60R 1/00 348/148 |
| 2012/0182426 A1* | 7/2012 | Fukuda | .................. | G06T 7/0042 348/148 |
| 2012/0293659 A1 | 11/2012 | Bandou | | |
| 2013/0054086 A1* | 2/2013 | Lo | .................. | B60R 1/00 701/36 |
| 2013/0169792 A1* | 7/2013 | Mathes | .................. | B62D 15/027 348/119 |
| 2014/0152778 A1* | 6/2014 | Ihlenburg | .................. | G06T 15/205 348/47 |
| 2014/0320658 A1* | 10/2014 | Pliefke | .................. | B60R 1/002 348/148 |

FOREIGN PATENT DOCUMENTS

| | | | |
|---|---|---|---|
| JP | 2011-151666 A | 8/2011 | |
| JP | 2012-124610 A | 6/2012 | |
| WO | WO-2010103961 A1 * | 9/2010 | ............ G08G 1/168 |

OTHER PUBLICATIONS

Jan. 17, 2017 Office Action issued in Japanese Patent Application No. 2013-016193.
Jan. 28, 2014 International Search Report issued in Application No. PCT/JP2013/079934.

* cited by examiner

IMAGE PROCESSING APPARATUS AND IMAGE PROCESSING METHOD FOR GENERATING SYNTHETIC IMAGE AND CHANGING SYNTHETIC IMAGE

CROSS-REFERENCE TO RELATED APPLICATIONS

This application is national stage application of International Application No. PCT/JP2013/079934, filed on Nov. 5, 2013, which designates the United States, incorporated herein by reference, and which claims the benefit of priority from Japanese Patent Application No. 2013-016193, filed on Jan. 30, 2013, the entire contents of which are incorporated herein by reference.

FIELD

The embodiments disclosed herein relate to an image processing apparatus and an image processing method.

BACKGROUND

Conventionally proposed are some apparatuses that apply image processing to camera images captured by a plurality of onboard cameras that are mounted on a vehicle, to generate a synthetic image providing a view of the conditions surrounding a vehicle from an optional virtual viewpoint such as immediately above or behind the vehicle, and to display the synthetic image on a display.

With such an apparatus, a camera image may be misaligned with respect to the position where the image is intended to be synthesized in the synthetic image, due to individual differences among the individual onboard cameras or slight errors at the position where the cameras are mounted. Workers of dealers, for example, therefore calibrate the onboard cameras to correct such misalignment.

To calibrate cameras, a worker displays the images captured by the respective onboard cameras while markers having a certain shape are placed around the vehicle, and sets some parameters indicating the positions of the images of the respective markers found in the images, for example (see Patent Literature 1, for example).

CITATION LIST

Patent Literature

Patent Literature 1: Japanese Patent Application Laid-open No. 2011-151666

Solution to Problem

An image processing apparatus for processing an image according to an aspect of the embodiments includes a generating unit, a display control unit, and a change receiving unit. The generating unit generates a synthetic image providing a view of a vehicle from a virtual viewpoint, based on a plurality of onboard camera images. The display control unit displays the generated synthetic image on a display unit. The change receiving unit receives a change in a relative positional relation between an image region that is based on one of the camera images and image regions that are based on the other camera images in the synthetic image. The generating unit generates the synthetic image, based on a changed positional relation every time a change in the positional relation is received.

DESCRIPTION OF EMBODIMENTS

Figure 1:
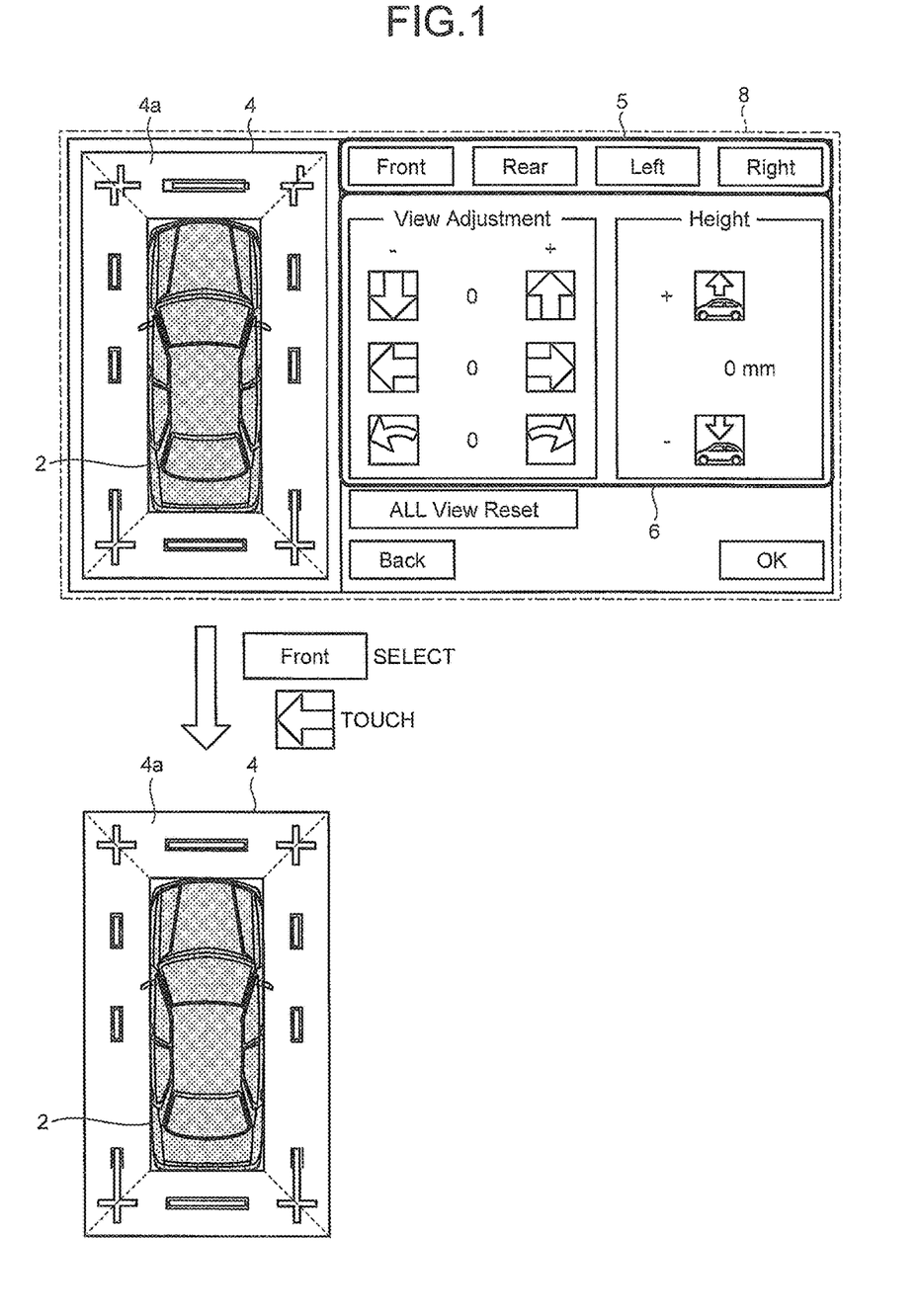
FIG. 1 is a schematic for explaining an image processing apparatus according to an embodiment.

An embodiment of an image processing apparatus and an image processing method that is disclosed by the present application will now be explained in detail with reference to the appended drawings, without any intention to limit the scope of the present invention to the embodiment described below in any way. To begin with, the image processing apparatus according to the embodiment will be generally explained with reference to FIG. 1. FIG. 1 is a schematic for explaining the image processing apparatus according to the embodiment.

The image processing apparatus according to the embodiment is an apparatus that generates a plan-view image (hereinafter, referred to as a "synthetic image") viewed from a virtual viewpoint above a vehicle 2, as illustrated in FIG. 1, by applying image processing to camera images (onboard camera images) captured by cameras disposed at four positions of the vehicle 2, that is, the front side, the rear side, the right side, and the left side of the vehicle 2, for example. The image processing apparatus displays the synthetic image on a display operation unit 8 that is provided in the vehicle and has a touch-panel function, for example.

If the camera provided on the front side of the vehicle 2 is installed out of a predetermined position or angle, for example, the image processing apparatus may generate an image in which the image of a region 4a, capturing the front side of the vehicle 2 as illustrated in FIG. 1, is not aligned with the other images along their border.

Because the users of the vehicle 2 may feel awkward about such a misalignment between the images along their border, workers of the dealer handling the vehicle 2, for example, perform a calibration to correct the misalignment of the images.

The image processing apparatus according to the embodiment enables such a calibration to be performed easily. Specifically, the image processing apparatus includes a display unit 4 for displaying a generated synthetic image for the surrounding of the vehicle, a selection receiving unit 5, and a change receiving unit 6 in a display area of the display operation unit 8.

The selection receiving unit 5 is an image including representations of operation buttons for receiving an operation of selecting one of the cameras provided to the vehicle 2. The change receiving unit 6 is an image including representations of operation buttons for receiving a change in the relative positional relation between an image region that is based on a camera image selected by the operation of the selection receiving unit 5 and the other image regions that is based on the other camera images in the synthetic image. More specifically, the change receiving unit 6 receives an operation of changing a region to be synthesized into the synthetic image, the region being a region of a camera image captured by the camera selected by an operation of the selection receiving unit 5.

In the image processing apparatus, if the image of the region 4a capturing the front side of the vehicle is misaligned with the other images along their border, as illustrated in FIG. 1 as an example, the worker calibrates the synthetic image by operating the selection receiving unit 5 and the change receiving unit 6.

For example, with the image processing apparatus, when the worker touches a Front button on the selection receiving unit 5, a control unit 15, which is to be described later (see FIG. 2), is caused to select the camera provided on the front side of the vehicle.

Every time the worker touches the left arrow button in the change receiving unit 6, the control unit 15 moves the region to be synthesized into the synthetic image to the right by a certain distance within the camera image captured by the camera disposed on the front side of the vehicle. Every time the control unit 15 moves the region, the synthetic image is generated and displayed on the display unit 4.

In this manner, the worker can resolve the misalignment between the image of the region 4a capturing the front side of the vehicle and the other images, as illustrated at the bottom in FIG. 1, by calibrating the synthetic image while looking at the synthetic image generated and displayed on the display unit 4 every time the worker touches the left arrow button in the change receiving unit 6. Specific examples of the synthetic images that are sequentially generated by the control unit 15 will be explained later with reference to FIGS. 5A to 5E.

Furthermore, with the image processing apparatus according to the embodiment, because the cameras that are mounted on the vehicle 2 can be calibrated in the units of one camera, the calibration can be simplified when any one camera is replaced, for example.

Figure 2:
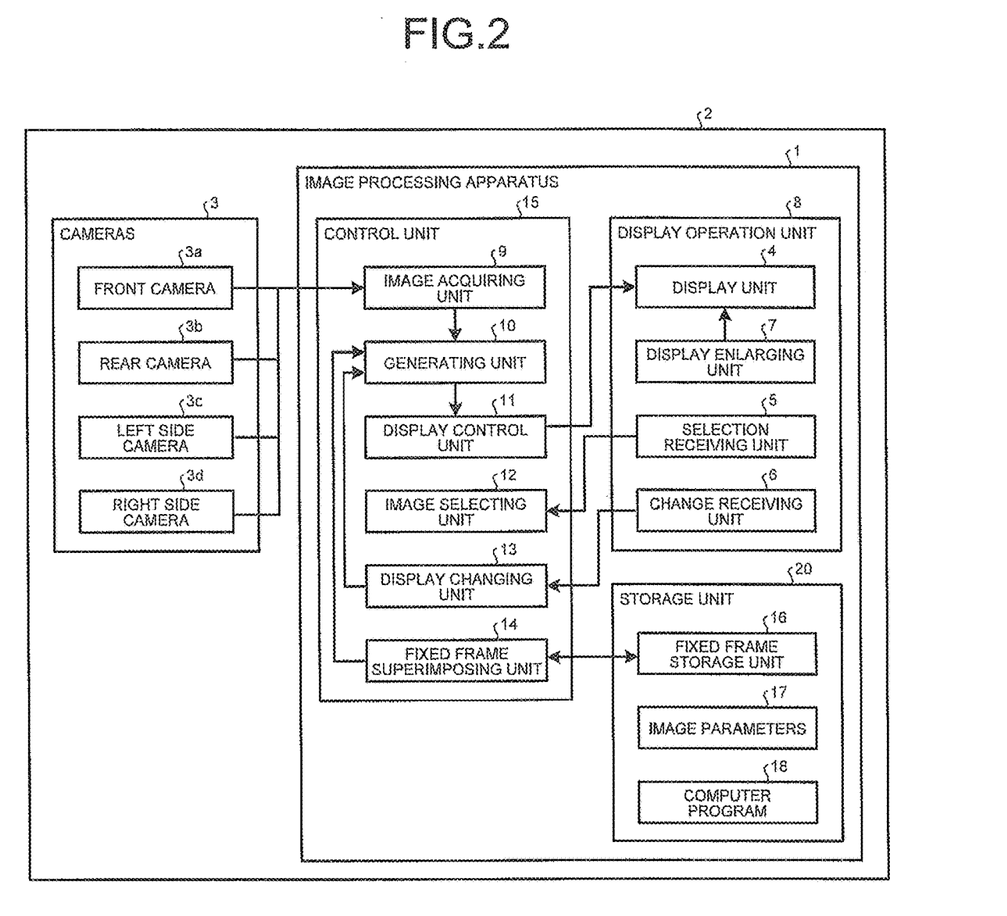
FIG. 2 is a block diagram illustrating a configuration of the image processing apparatus according to the embodiment.

A configuration of the image processing apparatus according to the embodiment will now be explained with reference to FIG. 2. FIG. 2 is a block diagram illustrating a configuration of the image processing apparatus according to the embodiment. As illustrated in FIG. 2, this image processing apparatus 1 is an apparatus used in the vehicle 2 with the onboard cameras 3.

The cameras 3 include a front camera 3a, a rear camera 3b, a left side camera 3c, and a right side camera 3d. Each of these front camera 3a, rear camera 3b, left side camera 3c, and right side camera 3d has an imaging device that electronically captures an image, such as a charge-coupled device (CCD) or a complementary metal oxide semiconductor (CMOS).

The front camera 3a is provided on the front end of the vehicle 2, e.g., near where the license plate is placed, and captures an image of the front side of the vehicle 2. The rear camera 3b is provided on the rear end of the vehicle 2, e.g., near where the license plate is placed, and captures an image of the rear side of the vehicle 2. The left side camera 3c and the right side camera 3d are provided near the respective door mirrors, for example, and capture images of the left side and the right side of the vehicle 2, respectively.

A wide-angle lens with an angular field of 180 degrees or more, such as a fish-eye lens, is used as a lens of the camera 3. With such a lens, images all around the vehicle 2 can be captured with four cameras 3.

The image processing apparatus 1 installed in the vehicle 2 with such onboard cameras 3 includes the display operation unit 8, the control unit 15, and a storage unit 20. The display operation unit 8 is a display device with a touch-panel function, and includes the display unit 4, the selection receiving unit 5, the change receiving unit 6, and a display enlarging unit 7. The display unit 4 outputs and displays a synthetic image generated by a generating unit 10, to be described later, via a display control unit 11.

The selection receiving unit 5 receives an operation of selecting one of the front camera 3a, the rear camera 3b, the left side camera 3c, and the right side camera 3d that are mounted on the vehicle 2, and outputs the selection to an image selecting unit 12 to be described later.

The change receiving unit 6 receives a change in the relative positional relation between an image region that is based on one camera image selected by an operation of the selection receiving unit 5, and image regions that are based on the other camera images in the synthetic image. More specifically, the change receiving unit 6 receives an operation of changing the region to be synthesized into the synthetic image (hereinafter, referred to as an "image-synthesized region"), within the image captured by selected one of the cameras 3a, 3b, 3c, and 3d, selected by an operation of the selection receiving unit 5, and outputs the change to a display changing unit 13 to be described later.

The display enlarging unit 7 enlarges, when a certain position is selected from the synthetic image displayed on the display unit 4, a part of the synthetic image including such a position, and displays the enlarged part on the display unit 4. The operation of the display enlarging unit 7 in response to a selecting operation will be described later with reference to FIGS. 8A and 8B.

The control unit 15 includes an image acquiring unit 9, the generating unit 10, the display control unit 11, the image selecting unit 12, the display changing unit 13, and a fixed frame superimposing unit 14.

The image acquiring unit 9 acquires camera images from the respective cameras 3a, 3b, 3c, and 3d that are mounted on the vehicle 2. The camera images acquired by the image acquiring unit 9 are output to the generating unit 10.

The generating unit 10 generates a synthetic image providing a view of the vehicle 2 from a virtual viewpoint, by performing image processing that patches together images represented in the respective regions of the respective camera images, corresponding to the respective cameras 3a, 3b, 3c, and 3d and acquired from the image acquiring unit 9, and outputs the synthetic image to the display control unit 11. The display control unit 11 then displays the synthetic image generated by the generating unit 10 on the display unit 4. The image selecting unit 12 selects the camera image acquired from selected one of the cameras 3a, 3b, 3c, and 3d, selected via the selection receiving unit 5.

The display changing unit 13 outputs the image of the image-synthesized region having been changed by an operation of the change receiving unit 6 to the generating unit 10. Every time the change receiving unit 6 receives a change in the relative positional relation between adjacent image regions in the synthetic image, the generating unit 10 generates a synthetic image to be displayed on the display unit 4 based on the changed positional relation. In other words, every time the change receiving unit 6 is operated, the display changing unit 13 causes the generating unit 10 to change the synthetic image to be displayed on the display unit 4 via the display control unit 11.

Figure 3:
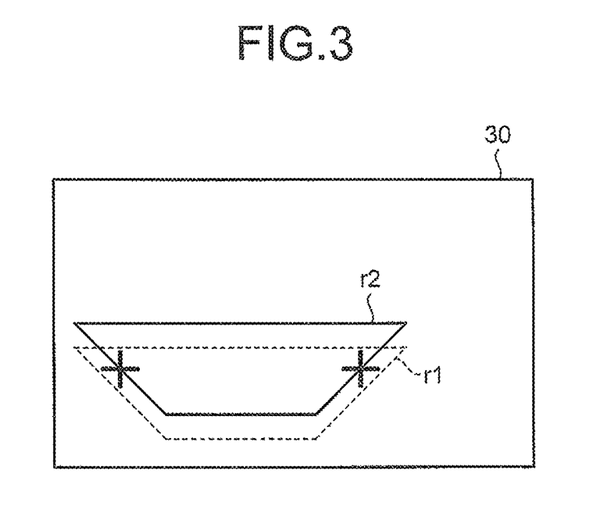
FIG. 3 is a schematic for explaining a display changing unit according to the embodiment.

Explained now with reference to FIG. 3 is how an image-synthesized region is changed by the display changing unit 13. FIG. 3 is a schematic for explaining how the display changing unit 13 according to the embodiment changes an image-synthesized region. To facilitate understanding, FIG. 3 illustrates a result of image processing in which a camera image 30 captured by the camera 3a that is mounted on the vehicle 2 is processed into a planar shape.

An image-synthesized region r1 illustrated in FIG. 3 is a region resulting in image misalignment when this image-synthesized region r1 is synthesized into the synthetic image, and an image-synthesized region r2 is a region not resulting in image misalignment when the image-synthesized region r2 is synthesized into the synthetic image.

The image processing apparatus 1, therefore, resolves the image misalignment, when the image-synthesized region r1 is used in the synthetic image, by changing the region to be synthesized into the synthetic image to the image-synthesized region r2 based on an operation of the change receiving unit 6.

Figure 4:
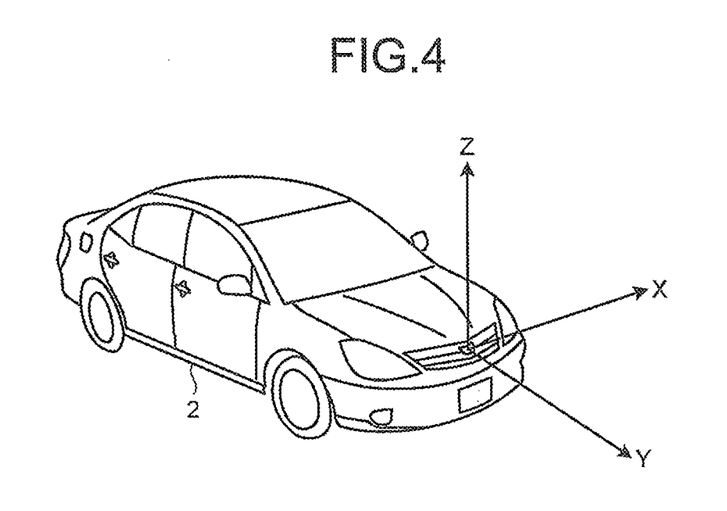
FIG. 4 is a schematic of a three-dimensional orthogonal coordinate system.

To facilitate understanding, explained herein is example in which the image-synthesized region is moved two-dimensionally within the camera image, but the image-synthesized region may be moved three-dimensionally depending on the positions or angles at which the cameras 3 are installed. FIG. 4 is a schematic of a three-dimensional orthogonal coordinate system defined in the image processing apparatus 1 according to the embodiment.

Illustrated in FIG. 4 is a three-dimensional orthogonal system with a Z axis having its positive direction plotted to the vertically upward direction and its negative direction plotted to the vertically downward direction, and a Y axis being perpendicular to the Z axis and having its positive direction plotted to the direction straight ahead of the vehicle 2.

A camera image captured by the camera 3 is changed by changing the roll angle, the tilt angle, the pan angle, and the like of the camera 3. The image-synthesized region in the camera image can also be changed based on the roll angle, the tilt angle, the pan angle, and the like of the camera 3, but it is difficult to make such a change intuitively.

In this embodiment, image parameters 17, which are to be described later, are prepared, and a worker is allowed to change the image-synthesized region based on the image parameters 17. In this manner, the worker can change the image-synthesized region intuitively by operating the change receiving unit 6.

The image parameters 17 can be acquired as, for example, combinations of the three-dimensional orthogonal coordinates, explained with reference to FIG. 4. Examples of such combinations are given in Table 1.

TABLE 1

| Camera | Up/Down buttons | Left/Right buttons | Rotation buttons |
|---|---|---|---|
| Front | X | Y, Z | Z |
| Rear | X | Y, Z | Z |
| Left Side | X, Z | Y | Z |
| Right Side | X, Z | Y | Z |

Referring to Table 1, to shift the image-synthesized region in the up-and-down directions in a front camera image that is a camera image captured by the front camera 3a, the image-synthesized region is rotated about the X axis serving as a rotation axis. To rotate the image-synthesized region in the front camera image, the image-synthesized region is rotated about the Z axis serving as a rotation axis. To shift the image-synthesized region in the front camera image in the left-and-right directions, the image-synthesized region needs to be rotated about the Y axis and the Z axis serving as the rotation axes respectively.

The combinations of the rotation axes indicated in Table 1 are merely exemplary, and may be changed depending on the angles at which the cameras 3 mounted on the vehicle 2 are installed.

Referring back to FIG. 2, with markers provided at predetermined respective positions with respect to the vehicle 2, when the relative position between the vehicle 2 and the markers in the synthetic image is matched with the relative position between the vehicle 2 and the markers, the fixed frame superimposing unit 14 superimposes indicators overlapping with the respective markers (hereinafter, referred to as "fixed frames"), at predetermined respective fixed positions in the synthetic image. In other words, the fixed frames indicate designed positions where the respective markers are represented in the synthetic image when the cameras 3 are installed in the vehicle 2 exactly as designed, and when the markers are arranged exactly as designed at the predetermined respective positions with respect to the vehicle 2. The fixed frames will be explained later.

The storage unit 20 is provided as a storage device such as a nonvolatile memory or a hard disk drive. The storage unit 20 may include volatile memory for temporarily storing therein data. A fixed frame storage unit 16, the image parameters 17, and a computer program 18 are stored in the storage unit 20.

The fixed frame storage unit 16 stores therein information related to the fixed frames to be superimposed over the synthetic image by the fixed frame superimposing unit 14. Such information may be data related to the relative positions of the fixed frames with respect to the image of the vehicle 2 in the synthetic image, or the shapes of the fixed frames themselves to be superimposed over the synthetic image, for example.

The image parameters 17 are parameters for allowing a worker to change an image-synthesized region to be synthesized into a synthetic image, which has been explained earlier with reference to FIG. 3, within a captured image, based on an operation performed on the change receiving unit 6.

The computer program 18 includes a computer program that is read from the storage unit 20 and executed by the control unit 15 to generate a synthetic image. The computer program 18 includes, for example, an image processing program causing a computer to execute a step at which the generating unit 10 generates a synthetic image providing a view of the vehicle 2 from a virtual viewpoint, based on a plurality of onboard camera images acquired by the image acquiring unit 9, a step at which the display control unit 11 displays the synthetic image generated by the generating unit 10 on the display unit 4, a step at which the change receiving unit 6 receives a change in the relative positional relation between an image region that is based on one of the camera images acquired by the image acquiring unit 9 and the image regions that are based on the other camera images acquired by the image acquiring unit 9, the relative positional relation being represented in the synthetic image generated by the generating unit 10, and a step at which the generating unit 10 generates a synthetic image, based on the changed positional relation every time the change receiving unit 6 receives a change in the positional relation.

By causing the control unit 15 of the image processing apparatus 1 to execute the image processing program, a synthetic image can be calibrated easily.

An exemplary transition of the display operation unit 8 according to the embodiment will now be explained with reference to FIGS. 5A to 5E. FIGS. 5A to 5E are schematics of a transition of the display operation unit 8 according to the embodiment.

Figure 5A:
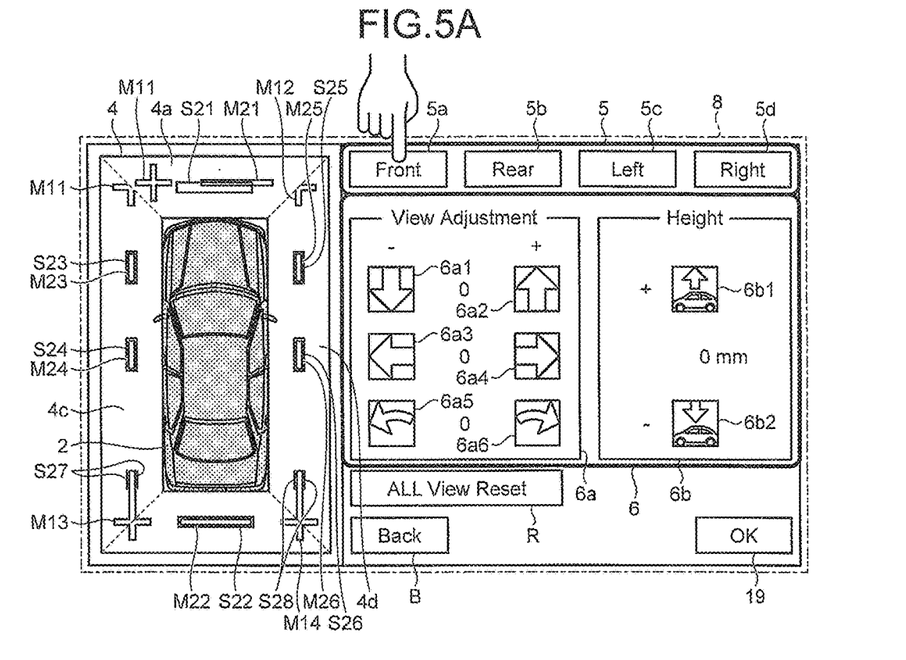
FIG. 5A is a schematic of transition of a display operation unit according to the embodiment.

As illustrated in FIG. 5A, the display operation unit 8 displays the display unit 4 for displaying a synthetic image, the selection receiving unit 5 and the change receiving unit 6 having been described earlier, a reset button R, a back button B, and a determination button (OK button) 19.

The selection receiving unit 5 includes a front camera selection receiving button 5a, a rear camera selection receiving button 5b, a left side camera selection receiving button 5c, and a right side camera selection receiving button 5d. The selection receiving unit 5 allows a worker to select one of the cameras 3a, 3b, 3c, and 3d that are provided on the front, the rear, the left, and the right sides of the vehicle 2, respectively, by touching one of the selection receiving buttons 5a to 5d. This configuration of the selection receiving unit 5 can be modified depending on the arrangement of or the number of the cameras that are mounted on the vehicle.

The change receiving unit 6 includes a direction change receiving unit 6a and a height change receiving unit 6b. The direction change receiving unit 6a includes a button 6a1 and a button 6a2 for shifting the image-synthesized region downwardly or upwardly, a button 6a3 and a button 6a4 for shifting the image-synthesized region to the left and to the right, respectively, and a button 6a5 and a button 6a6 for rotating the image-synthesized region counterclockwise and clockwise, respectively. The height change receiving unit 6b includes a button 6b1 and a button 6b2 for shifting the image-synthesized region in the height directions, that is, in the positive direction and the negative direction, respectively, along the Z axis illustrated in FIG. 4.

The reset button R is a button for bringing (resetting) the position of an image-synthesized region back to a default position within the captured image after the position is changed by an operation of the change receiving unit 6. The back button B is a button for bringing the synthetic image displayed on the display unit 4 back to the previous one, being previous to an operation of the selection receiving unit 5 or the change receiving unit 6. The determination button 19 is a button for committing the synthetic image to be displayed on the display unit 4, after the image-synthesized region is changed by an operation of the selection receiving unit 5 or the change receiving unit 6.

Found in the synthetic image displayed on the display unit 4 are images of markers M11 to M14 that are first markers provided to predetermined respective positions with respect to the vehicle parked on a parking plane in the working space provided to a vehicle factory or a vehicle servicing shop, for example.

The markers M11 to M14 are provided to allow checking whether adjacent images to be patched together by the generating unit 10 illustrated in FIG. 2 are misaligned with respect to each other along their border, that is, along a broken line, illustrated in FIG. 5A, on the display unit 4.

Specifically, each of the markers M11 to M14 has a cross shape consisting of two lines having a certain width and length and intersecting with each other perpendicularly, and each of these markers M11 to M14 is provided at a position within the angles of view of two cameras that are adjacently disposed along the outer periphery of the vehicle 2.

By providing the markers M11 to M14, the worker can calibrate the synthetic image by operating the change receiving unit 6 in such a manner that each of the markers M11 to M14 forms a certain cross shape at their corresponding border between the images in the synthetic image.

For example, as illustrated in FIG. 5A, when the image of the markers M11 and M12 represented in the region 4a of the display unit 4 is misaligned with the image of the same markers represented in other regions of the display unit 4, the worker selects the front camera 3a by operating the front camera selection receiving button 5a.

Figure 5B:
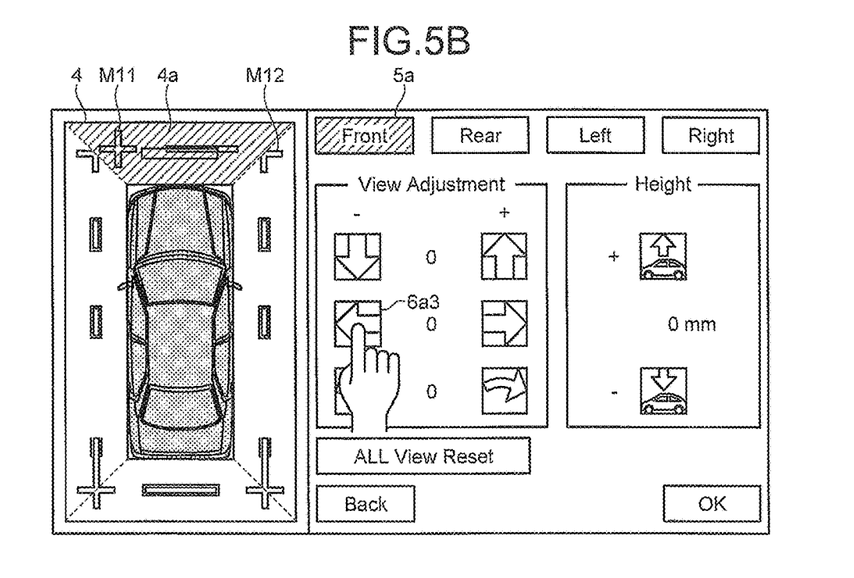
FIG. 5B is a schematic of the transition of the display operation unit according to the embodiment.
Figure 5C:
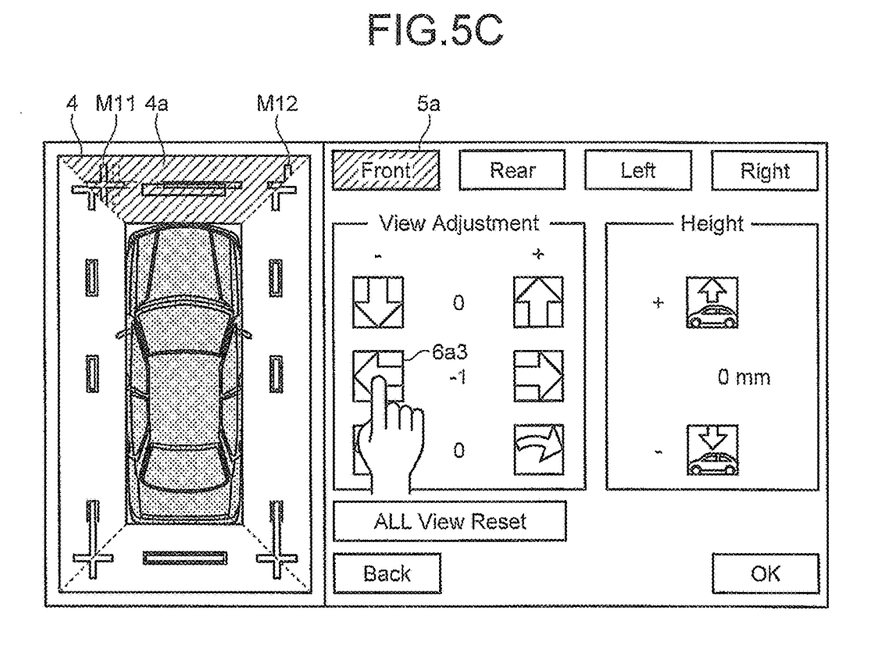
FIG. 5C is a schematic of the transition of the display operation unit according to the embodiment.

This operation causes the front camera selection receiving button 5a to be selected, and the image in the region 4a is displayed in a manner explicitly indicating that the image is now enabled to be changed, as illustrated in FIG. 5B. If the worker operates the button 6a3 to shift the markers M11 and M12 to the left, a synthetic image having the image of the markers M11 and M12 represented in the region 4a shifted to the left by predetermined one unit is generated and displayed on the display unit 4, as illustrated in FIG. 5C.

At this time, the number indicating the amount of operation, displayed beside the button 6a3, is updated from "0" to "−1". This allows the worker to recognize a numeric representation of the amount by which the button 6a3 is operated. In the synthetic image illustrated in FIG. 5C, the markers M11 and M12 have not formed the certain cross shape at their respective image borders.

Figure 5D:
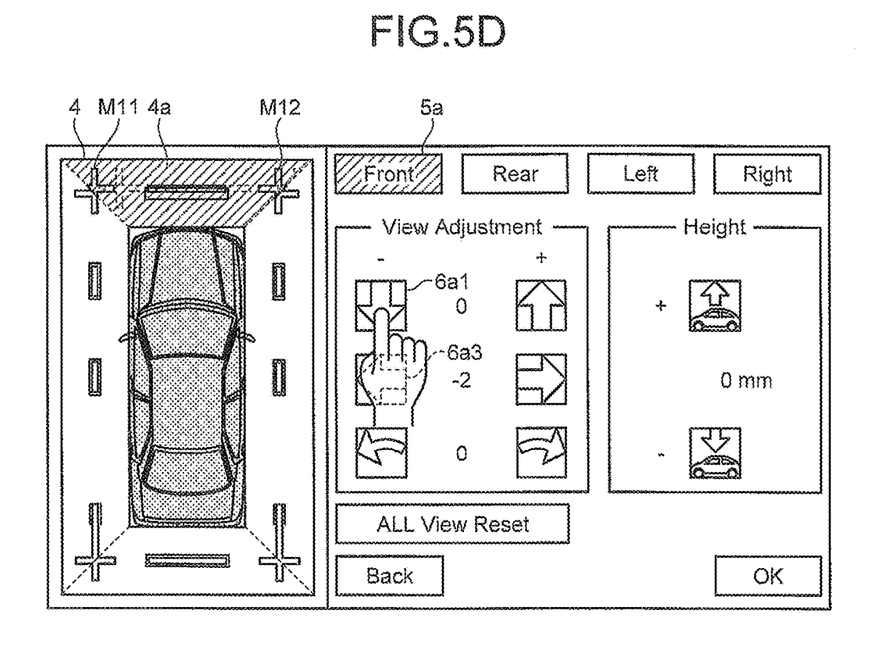
FIG. 5D is a schematic of the transition of the display operation unit according to the embodiment.

Therefore, the worker again operates the button 6a3 for changing the image-synthesized region to shift the markers M11 and M12 to the left. A resultant synthetic image having the image of the markers M11 and M12 in the region 4a shifted to the left by predetermined one unit is then generated and displayed on the display unit 4, as illustrated in FIG. 5D. At this time, the number displayed beside the button 6a3 is updated from "−1" to "−2".

In the synthetic image illustrated in FIG. 5D, the horizontal misalignment of the markers M11 and M12 at their respective image borders are resolved, but the vertical misalignment is yet to be resolved. Therefore, the worker then operates the button 6a1 for changing the image-synthesized region in a manner shifting the markers M11 and M12 downwardly.

Figure 5E:
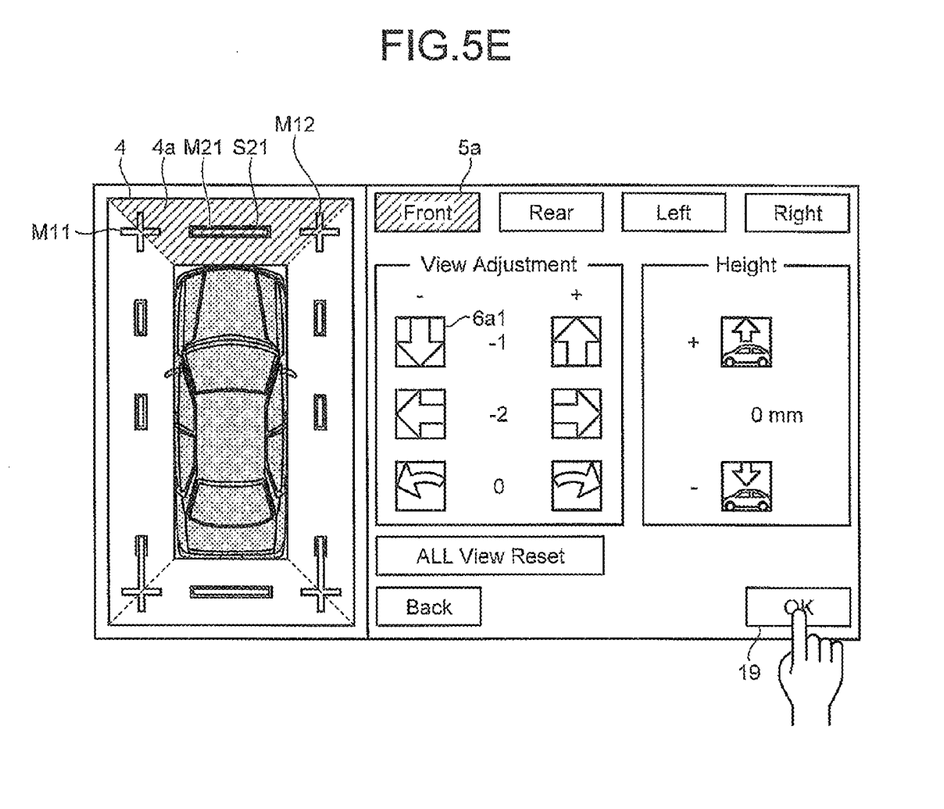
FIG. 5E is a schematic of the transition of the display operation unit according to the embodiment.

In this manner, the image of the markers M11 and M12 represented in the region 4a is shifted downwardly by predetermined one unit, and a synthetic image in which each of the markers M11 and M12 forms the certain cross shape at the corresponding image border is generated and displayed on the display unit 4, as illustrated in FIG. 5E. At this time, the number displayed beside the button 6a1 is updated from "0" to "−1". Once the misalignment at each of the image borders in the synthetic image has been resolved, the worker operates the determination button 19, and ends the calibration.

As explained with reference to FIGS. 5A to 5E, the image processing apparatus 1 changes the synthetic image in such a manner that the image of each of the markers M11 to M14 forms the certain cross shape in the synthetic image at the corresponding image border that is indicated by broken lines in the display unit 4. In this manner, awkwardness resulting from the misalignment at the image borders is resolved in the synthetic image.

Even after a synthetic image is generated and displayed in such a manner that the image of each of the markers M11 to M14 represented in the synthetic image forms the certain cross shape at the corresponding image border indicated by a broken line in the display unit 4, the relative position between the vehicle and the markers M11 to M14 in the synthetic image may be still mismatched with the relative position between the vehicle and the markers M11 to M14.

For example, even when all of the four markers M11 to M14 forms a cross shape, the entire markers M11 to M14 may be represented shifted in a particular direction with respect to the vehicle in the synthetic image.

This may lead to a problem when the synthetic image is used in assisting a driver making a driving operation for reversing the vehicle, for example. Such a problem will now be explained with reference to FIG. 6.

Figure 6:
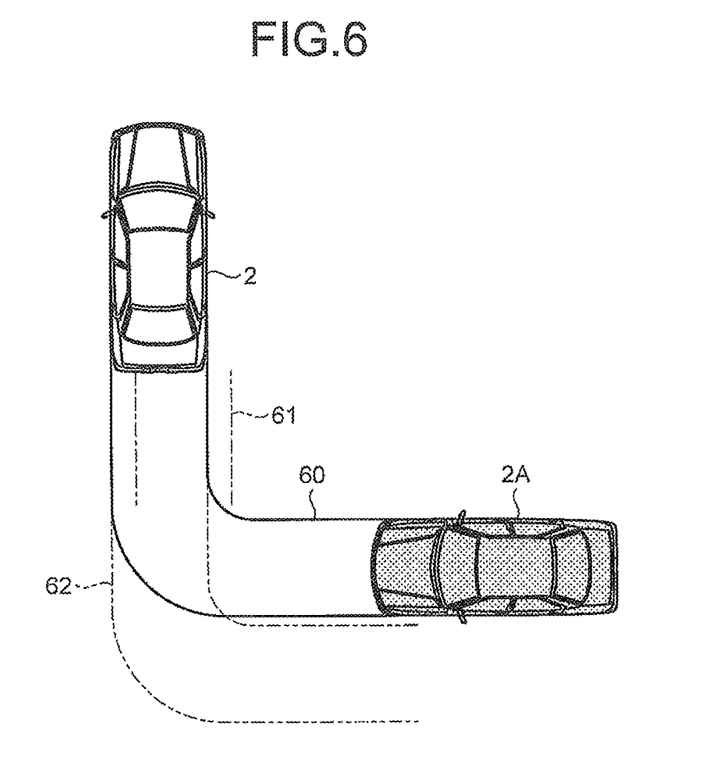
FIG. 6 is a plan view illustrating an exemplary guiding trajectory displayed when a driver attempts to reverse the vehicle.

FIG. 6 is a plan view illustrating an example of guiding trajectory displayed when a driver attempts to reverse the vehicle 2. In FIG. 6, the lines 60 represent a plan-view image of a predicted guiding trajectory when the vehicle 2 is to be reversed to a position 2A while the relative position between the vehicle and the markers M11 to M14 and in the synthetic image are matched with the relative position between the vehicle and the markers M11 to M14.

If the relative position between the vehicle and the markers M11 to M14 represented in the synthetic image is misaligned with the relative position between the vehicle and the markers M11 to M14 in the left-and-right direction, for example, a guiding trajectory that is misaligned in the left-and-right direction with respect to the vehicle 2 may be displayed, as indicated by the lines 61. If the relative position between the vehicle and the markers M11 to M14 represented in the synthetic image is misaligned with the relative position between the vehicle and the markers M11 to M14 in the front-and-back direction, for example, a guiding trajectory misaligned in the front-and-back direction with respect to the vehicle 2 may be displayed as indicated by the lines 62.

In the manner described above, when the relative position between the vehicle and the markers is not matched with the relative position between the vehicle and the markers in the synthetic image, a driver who is to reverse the vehicle might experience a problem in a back guide monitor or the like predicting the trajectory of the vehicle based on an steering angle of the steering wheel.

In this embodiment, therefore, second markers M21 to M26 are provided at predetermined respective positions with respect to the vehicle parked on a parking plane in the working space provided to a vehicle factory or a vehicle servicing shop, for example. Such second markers M21 to M26 are represented in the synthetic image displayed on the display unit 4, as illustrated in FIG. 5A.

The marker M21 is provided within the angle of view of the front camera 3a, and the marker M22 is provided within the angle of view of the rear camera 3b. The marker M21 and the marker M22, each of which is a line shape having a certain width and length, are positioned in parallel with each other with the vehicle 2 interposed therebetween.

Both of the markers M23 and M24 are provided within the angle of view of the left side camera 3c, and both of the markers M25 and M26 are provided within the angle of view of the right side camera 3d.

The marker M23 and the marker M25, each of which is a line shape having a certain width and length, are positioned in parallel with each other with the vehicle 2 interposed therebetween. In the same manner, the marker M24 and the marker M26, each of which is a line shape having a certain width and length, are positioned in parallel with each other with the vehicle 2 interposed therebetween.

To simplify the explanation about the layout of the markers, the line representing each of the markers is assumed to have a certain length, while the width of the line is ignored.

The marker M21 extends along a line that connects the intersection between the two lines making up the marker M11 and the intersection between the two lines making up the marker M12. The marker M22 extends along a line that connects the intersection between the two lines making up the marker M13 and the intersection between the two lines making up the marker M14.

The markers M23 and M24 both extend along the line connecting the intersection between the two lines making up the marker M11 and the intersection between the two lines making up the marker M13. The markers M25 and M26 both extend along a line that connects the intersection between the two lines making up the marker M12 and the intersection between the two lines making up the marker M14.

In the display unit 4, frame-shaped indicators S21 to S28 (hereinafter, referred to as "fixed frames") are displayed superimposed over predetermined respective fixed positions in the synthetic image. Among these fixed frames, the fixed frames S21 to S26 overlap with the respective markers M21 to M26 represented in the synthetic image when the relative position between the vehicle 2 and the markers M21 to M26 represented in the synthetic image is matched with the relative position between the vehicle 2 and the markers M21 to M26 provided at the predetermined respective positions with respect to the vehicle 2.

The fixed frames S27 and S28 overlap with the respective markers M13 and M14 represented in the respective regions 4c and 4d of the synthetic image when the relative relation between the vehicle 2 and the markers M13 and M14 represented in the respective regions 4c and 4d of the synthetic image is matched with the relative position between the vehicle 2 and the markers M13 and M14 provided at the predetermined respective positions with respect to the vehicle 2.

In this manner, by allowing a worker to change the synthetic image with reference to the fixed frames S21 to S28, the absolute positioning of the markers with respect to the vehicle is represented accurately, and therefore, the accuracy of the calibration can be further improved.

Figure 7:
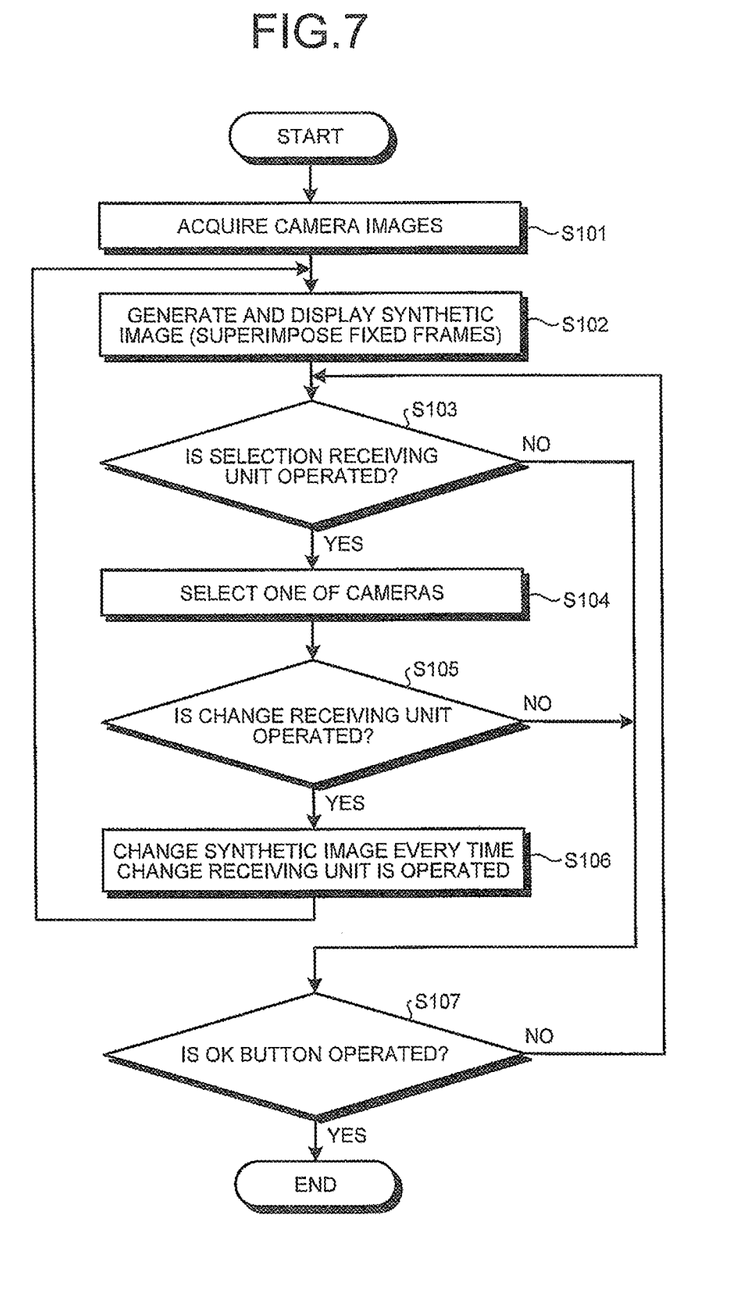
FIG. 7 is a flowchart illustrating a process performed by a control unit in the image processing apparatus according to the embodiment.

A process performed by the control unit 15 in the image processing apparatus 1 according to the embodiment will now be explained with reference to FIG. 7. FIG. 7 is a flowchart illustrating process performed by the control unit 15 in the image processing apparatus 1 according to the embodiment.

As illustrated in FIG. 7, to begin with, the control unit 15 acquires camera images captured by the respective cameras 3a, 3b, 3c, and 3d that are mounted on the vehicle 2 (Step S101). The control unit 15 then generates a synthetic image providing a view of the conditions surrounding the vehicle 2 by performing image processing that patches together the images of the regions selected from the respective captured camera images, and displays the synthetic image on the display unit 4 (Step S102). At this time, the control unit 15 may superimpose the fixed frames overlapping with the respective markers at their predetermined respective fixed positions in the synthetic image when the relative position between the vehicle 2 and the markers in the synthetic image is matched with the relative position between the vehicle 2 and the markers provided at the predetermined respective positions with respect to the vehicle 2.

The control unit 15 then determines whether the selection receiving unit 5 has been operated (Step S103). If the control unit 15 determines that the selection receiving unit 5 has been operated (Yes at Step S103), the process is shifted to Step S104. If the control unit 15 determines that the selection receiving unit 5 has not been operated (No at Step S103), the process is shifted to Step S107.

The control unit 15 then selects one of the cameras 3 based on the operation performed on the selection receiving unit 5 at Step S103 (Step S104), and the process is shifted to Step S105.

The control unit 15 then determines whether the change receiving unit 6 has been operated (Step S105). If the control unit 15 determines that the change receiving unit 6 has been operated (Yes at Step S105), the process is shifted to Step S106. If the control unit 15 determines that the change receiving unit 6 has not been operated (No at Step S105), the process is shifted to Step S107.

The control unit 15 changes the synthetic image generated by the generating unit 10 and displayed on the display unit 4 via the display changing unit 13 every time the change receiving unit 6 is operated (Step S106). The process then returns to Step S102.

The control unit 15 also determines whether the determination button 19 has been operated (Step S107). If the control unit 15 determines that the determination button 19 has not been operated (No at Step S107), the process returns to Step S103. If the control unit 15 determines that the determination button 19 has been operated (Yes at Step S107), the last synthetic image displayed on the display unit 4 is committed as the final image.

As described above, the image processing apparatus for processing images according to the embodiment includes a generating unit, a display control unit, and a change receiving unit. The generating unit generates a synthetic image providing a view of a vehicle from a virtual viewpoint, based on a plurality of onboard camera images. The display control unit displays the generated synthetic image on a display unit. The change receiving unit receives a change in a relative positional relation between an image region that is based on one of the camera images and image regions that are based on the other camera images in the synthetic image. The generating unit generates the synthetic image, based on a changed positional relation every time a change in the positional relation is received.

With the image processing apparatus according to the embodiment, therefore, a worker can calibrate onboard cameras easily.

When the display screen of the display unit 4 is small or the resolution is low, the worker might be incapable of determining whether the synthetic image resultant of a change made by an operation of the change receiving unit 6 has been adjusted accurately. In such a case, a part of the synthetic image may be enlarged, as illustrated in FIGS. 8A and 8B.

Figure 8A:
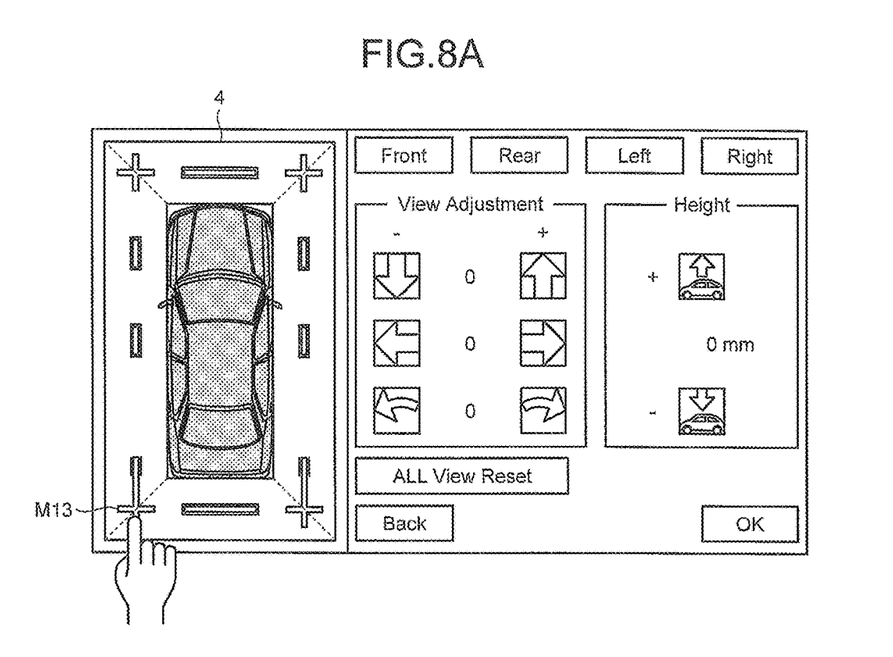
FIG. 8A is a plan view of the display operation unit according to the embodiment.

FIG. 8A is a plan view of the display operation unit 8 according to the embodiment. FIG. 8B is a plan view of the display operation unit 8 with the display unit 4 illustrated in FIG. 8A displayed in an enlargement manner.

Figure 8B:
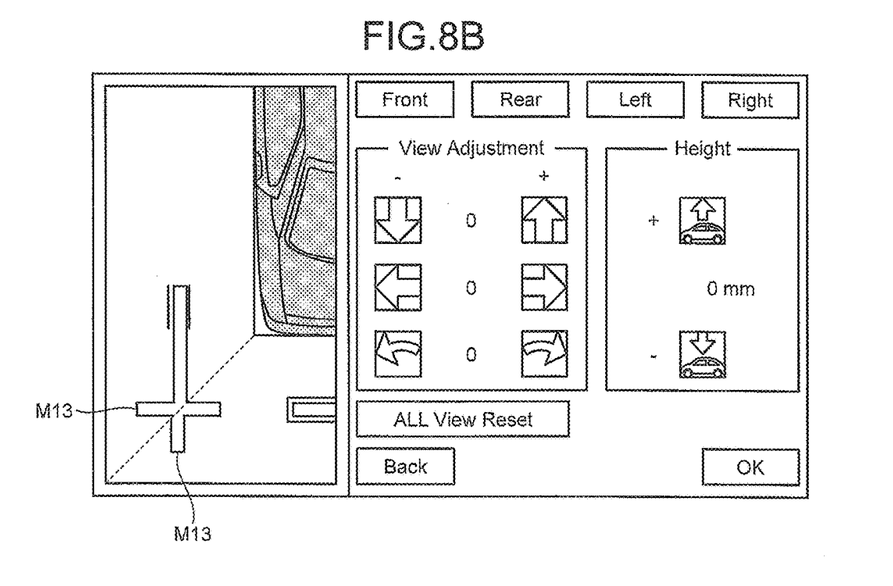
FIG. 8B is a plan view of the display operation unit with the display unit illustrated in FIG. 8A displayed in an enlargement manner.

In FIG. 8A, when a position near the marker M13 is selected in the synthetic image displayed on the display unit 4, a part of the synthetic image including such a position is enlarged, as illustrated in FIG. 8B, and displayed on the display unit 4. By performing such an operation of enlarging a part of the synthetic image, a worker can easily determine whether the worker has operated the change receiving unit 6 appropriately. Therefore, the onboard cameras can be calibrated easily and accurately.

In the embodiment described above, the display operation unit 8 is explained to be a touch panel, but only the display unit 4 may be displayed on the display, and the buttons included in the selection receiving unit 5 and the change receiving unit 6, and the display enlarging unit 7 may be configured as buttons that are operated by being physically pressed down.

Figure 9:
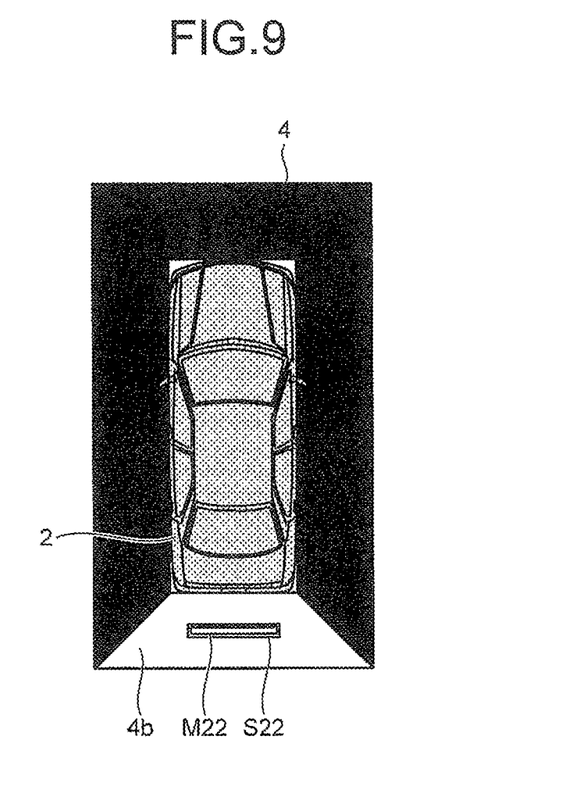
FIG. 9 is a plan view of the display unit according to the embodiment.

Furthermore, in the embodiment described above, the image processing apparatus 1 is explained to perform the image processing based on a synthetic image generated from camera images captured by a plurality of cameras 3 mounted on the vehicle 2, but the image processing apparatus 1 may also perform the image processing to a camera image captured by a single camera 3, for example, as illustrated in FIG. 9. FIG. 9 is a plan view of the display unit according to the embodiment.

A synthetic image generated based only on the camera image captured by the rear camera 3b, as illustrated in FIG. 9, presents a plan view image of the rear side of the vehicle 2, which is merely a part of the synthetic image presenting a plan view of the entire environment surrounding the vehicle 2, as explained in the embodiment.

In other words, the image processing apparatus 1 may generate a synthetic image of the vehicle 2 viewed from a virtual viewpoint, based on a single onboard camera image, and display the generated synthetic image on the display unit 4. The image processing apparatus 1 may then receive a change in the relative positional relation between the fixed frame S22 displayed at a predetermined position of the synthetic image and the marker M22 represented in the synthetic image, and generate a synthetic image, based on a changed positional relation every time the image processing apparatus 1 receives an change in the positional relation.

In the embodiment described above, the single camera 3 is explained to be the rear camera 3b, but may be any one of the front camera 3a, the left side camera 3c, or the right side camera 3d.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image processing apparatus for processing an image, the image processing apparatus comprising a processor configured to:

generate a synthetic image (i) providing, based on a plurality of onboard camera images, a view of an environment surrounding a vehicle positioned on a predetermined parking zone from a virtual viewpoint and (ii) including images of markers provided at predetermined positions with respect to the parking zone that correspond to the camera images;

superimpose frame-shaped indicators at predetermined fixed positions in the synthetic image;

display the generated synthetic image and the frame-shaped indicators on a display;

when among the marker images and the frame-shaped indicators, one marker image and a corresponding frame-shaped indicator on the display do not match each other, receive a change of an image region that is based on one camera image including the one marker image, a of the camera images, while the vehicle is stopping on the parking zone; and generate a changed synthetic image based on the changed image region every time a change in the image region is received without moving the vehicle.

2. The image processing apparatus according to claim 1, wherein when a position is selected in the synthetic image displayed on the display, the processor is further configured to enlarge a part of the synthetic image including the position and display the enlarged part on the display.

3. An image processing method comprising:

generating a synthetic image (i) providing, based on a plurality of onboard camera images, a view of an environment surrounding a vehicle positioned on a predetermined parking zone from a virtual viewpoint and (ii) including images of first markers positioned at predetermined positions with respect to the parking zone that correspond to the camera images on a parking plane on which the vehicle is parked;

superimposing frame-shaped indicators at predetermined fixed positions in the synthetic image;

displaying the generated synthetic image and the frame-shaped indicators;

when among the marker images and the frame-shaped indicators, one marker image and a corresponding frame-shaped indicator on the display do not match each other, receiving a change of an image region that is based on one camera image including the image of the first marker of the camera images, while the vehicle is stopping on the parking zone; and generating a changed synthetic image based on the image region every time a change in the image region is received without moving the vehicle.

4. The image processing method according to claim 3, further comprising changing the relative positional relation and generating the synthetic image so that an image of a second marker included in the synthetic image forms a certain shape, the second marker being positioned within angles of view of two onboard cameras that are adjacently disposed along an outer periphery of the vehicle on the parking plane.

5. An image processing apparatus for processing an image, the image processing apparatus comprising a processor configured to:

generate a synthetic image (i) providing, based on a single onboard camera image including the image of the marker, a view of an environment surrounding a vehicle positioned on a predetermined parking zone from a virtual viewpoint and (ii) including an image of a marker provided at a predetermined position with respect to the parking zone that correspond to the camera image;

superimpose a frame-shaped indicator at a predetermined fixed position in the synthetic image;

display the generated synthetic image and the frame-shaped indicator on a display;

when the marker image and the frame-shaped indicator on the display do not match each other, receive a change of an image region that is based on the camera image, while the vehicle is stopping on the parking zone; and generate a changed synthetic image based on the changed image region every time a change in the image region is received without moving the vehicle.

* * * * *